(12) United States Patent
Go et al.

(10) Patent No.: US 12,367,018 B2
(45) Date of Patent: Jul. 22, 2025

(54) UI COMPONENT CONFIGURATION SYSTEM APPARATUS THAT PROVIDES A UI COMPONENT CONFIGURATION SERVICE THAT CAN TRANSFORM AND CONFIGURE UI COMPONENTS OF AN APPLICATION BASED ON DEVICE CHARACTERISTICS AND THE OPERATING METHOD THEREOF

(71) Applicant: TOBESOFT CO., LTD., Seoul (KR)

(72) Inventors: HyunJung Go, Suwon-si (KR); YeonSil Jeong, Seoul (KR); Jea Il Kim, Namyangju-si (KR)

(73) Assignee: TOBESOFT CO., LTD., Seoul (KR)

( * ) Notice: Subject to any disclaimer, the term of this patent is extended or adjusted under 35 U.S.C. 154(b) by 232 days.

(21) Appl. No.: 18/236,401

(22) Filed: Aug. 22, 2023

(65) Prior Publication Data

US 2024/0134617 A1 Apr. 25, 2024
US 2024/0231774 A9 Jul. 11, 2024

(30) Foreign Application Priority Data

Oct. 20, 2022 (KR) .......................... 10-2022-0135419

(51) Int. Cl.
G06F 8/41 (2018.01)
(52) U.S. Cl.
CPC ....................... G06F 8/41 (2013.01)
(58) Field of Classification Search
CPC ....................... G06F 8/20; G06F 8/41
See application file for complete search history.

(56) References Cited

U.S. PATENT DOCUMENTS

| 11,301,271 | B1* | 4/2022 | Fedayev | G06F 16/438 |
| 2020/0133444 | A1* | 4/2020 | Hou | G06F 16/906 |
| 2020/0341779 | A1* | 10/2020 | Rohde | G06F 8/20 |
| 2020/0341781 | A1* | 10/2020 | Schoppe | H04L 67/535 |
| 2020/0380624 | A1* | 12/2020 | Turgman | H04L 63/083 |
| 2021/0281654 | A1 | 9/2021 | Howett et al. | |
| 2021/0349583 | A1* | 11/2021 | Guzman | G06F 3/04817 |
| 2022/0121357 | A1 | 4/2022 | Kim et al. | |

FOREIGN PATENT DOCUMENTS

| CN | 107408042 A | * 11/2017 | ......... G06F 11/2071 |
| CN | 115220718 A | * 10/2022 | |
| JP | 2020-074106 A | 5/2020 | |
| KR | 10-2011-0133286 A | 12/2011 | |
| KR | 10-1158019 B1 | 6/2012 | |
| KR | 10-2014-0083113 A | 7/2014 | |
| KR | 10-2347733 B1 | 1/2022 | |
| KR | 10-2022-0045743 A | 4/2022 | |

* cited by examiner

Primary Examiner — Phillip H Nguyen
(74) Attorney, Agent, or Firm — Park, Kim & Suh, LLC

(57) ABSTRACT

Disclosed are a UI component configuration system apparatus for providing a service that can dynamically transform and configure, according to characteristics of an electronic device in which applications are driven, designs of UI components included in the applications, and the operating method thereof to enable providing an appropriate UI design according to device characteristics of a user.

11 Claims, 2 Drawing Sheets

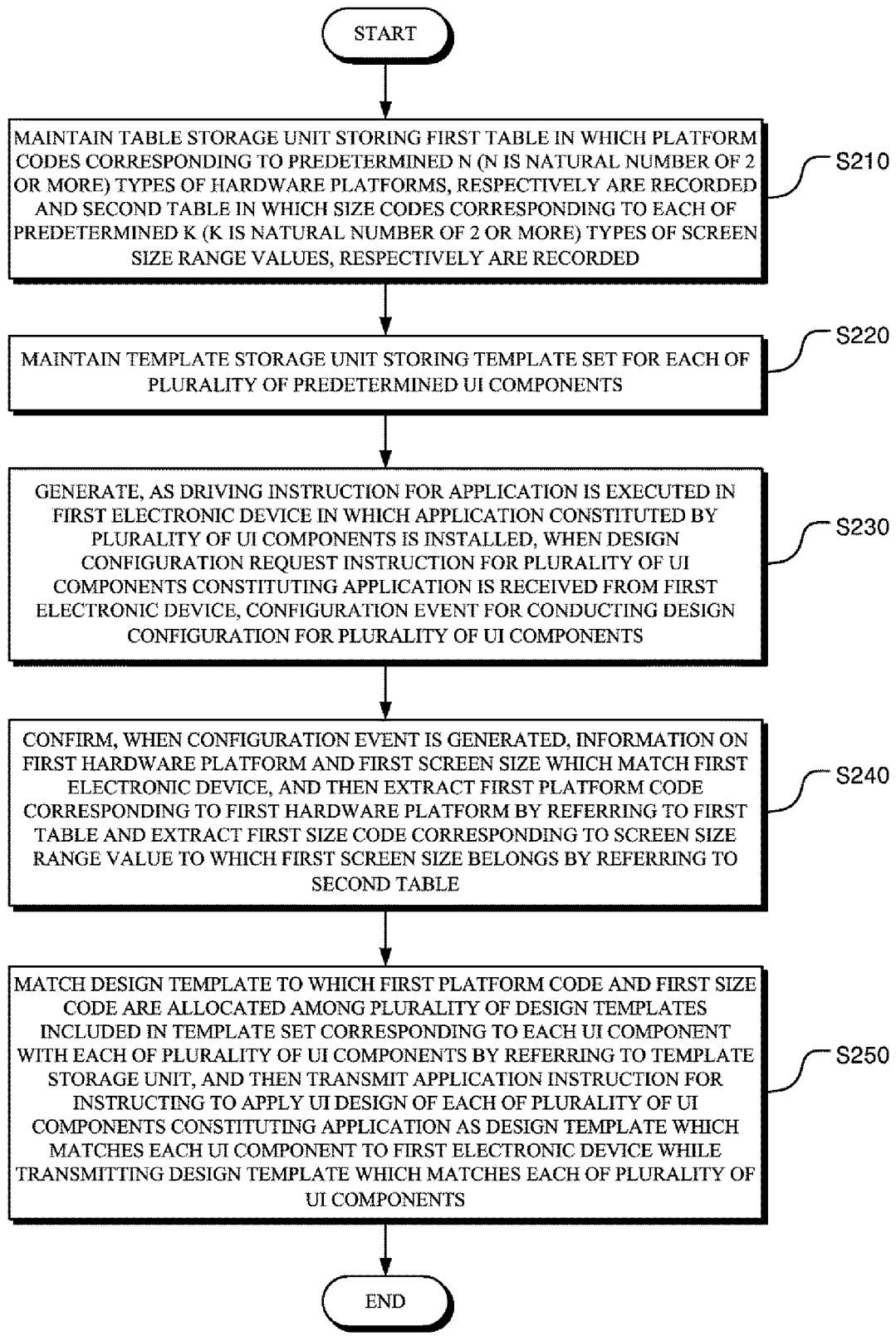

UI COMPONENT CONFIGURATION SYSTEM APPARATUS THAT PROVIDES A UI COMPONENT CONFIGURATION SERVICE THAT CAN TRANSFORM AND CONFIGURE UI COMPONENTS OF AN APPLICATION BASED ON DEVICE CHARACTERISTICS AND THE OPERATING METHOD THEREOF

CROSS-REFERENCE TO RELATED APPLICATIONS

This application claims priority to and the benefit of Korean Patent Application No. 10-2022-0135419 filed in the Korean Intellectual Property Office on Oct. 20, 2022, the entire contents of which are incorporated herein by reference.

TECHNICAL FIELD

The present invention relates to a UI component configuration system apparatus that provides a UI component configuration service that can transform and configure UI components of applications based on device characteristics and the operating method thereof.

BACKGROUND ART

In general, users who develop a user interface (UI) often generate various UI components such as a button, a text input box, a menu window, etc., in order to implement various functions when developing the UI by using a UI development tool.

In this regard, a user who intends to develop a predetermined UI needs to perform a design task for UI components constituting the UI by considering an industrial classification to which the UI is to be applied, or a hardware platform related to a job of a user who is to use the UI or a target product to which the UI is applied.

The design of this UI is one of the most important things because the design of the UI plays a lot of roles in promoting the usage convenience of users using the applications with the corresponding UI.

However, ordinary applications are often composed of UI components consisting of one type of UI design designated by developers, so there is a problem of not providing an appropriate UI design according to device characteristics of a user using the application.

In this regard, if a device used by the user is a device according to a hardware platform, which is called mobile terminal, and a size of a screen is a size suitable for carrying, it may be appropriate that the sizes of UI components such as buttons or text input boxes are larger than those in general situations, or colors of the UI components have a higher readability than those in general situations.

Therefore, the design of the UI component is not limited to one type, but according to the characteristics of the device that drives the application, a research on a technology that supports the design of the UI component that constitutes the application capable of dynamically changing and applying is required.

SUMMARY OF THE INVENTION

The present invention has been made in an effort to provide a UI component configuration system apparatus for providing a service that can dynamically transform and configure, according to characteristics of an electronic device in which applications are driven, designs of UI components included in the applications, and the operating method thereof to enable providing an appropriate UI design according to device characteristics of a user.

An exemplary embodiment of the present invention provides a UI component configuration system apparatus that provides a UI component configuration service that can transform and configure UI components of an application based on device characteristics, which includes: a table storage unit storing a first table in which platform codes corresponding to predetermined n (n is a natural number of 2 or more) types of hardware platforms, respectively are recorded and a second table in which size codes corresponding to each of predetermined k (k is a natural number of 2 or more) types of screen size range values, respectively are recorded; a template storage unit storing a template set for each of a plurality of predetermined UI components, in which the template set for each of the plurality of UI components means a set constituted by a plurality of design templates pre-made for expressing each UI component, and a platform code for the hardware platform and a screen code for the screen size range value pre-specified to match each design template from the n types of hardware platforms and the k types of screen size range values, respectively are allocated to the plurality of design templates included in the template set for each of the plurality of UI components; an event generation unit generating, as a driving instruction for the application is executed in a first electronic device in which the application constituted by the plurality of UI components is installed, when a design configuration request instruction for the plurality of UI components constituting the application is received from the first electronic device, a configuration event for conducting a design configuration for the plurality of UI components; a code extraction unit confirming, when the configuration event is generated, information on a first hardware platform and a first screen size which match the first electronic device, and then extracting a first platform code corresponding to the first hardware platform by referring to the first table and extracting a first size code corresponding to a screen size range value to which the first screen size belongs by referring to the second table; and an instruction transmission unit matching a design template to which the first platform code and the first size code are allocated among a plurality of design templates included in the template set corresponding to each UI component with each of the plurality of UI components by referring to the template storage unit, and then transmitting an application instruction for instructing to apply the UI design of each of the plurality of UI components constituting the application as the design template which matches each UI component to the first electronic device while transmitting the design template which matches each of the plurality of UI components.

Another exemplary embodiment of the present invention provides an operating method of a UI component configuration system apparatus that provides a UI component configuration service that can transform and configure UI components of an application based on device characteristics, which includes: maintaining a table storage unit storing a first table in which platform codes corresponding to predetermined n (n is a natural number of 2 or more) types of hardware platforms, respectively are recorded and a second table in which size codes corresponding to each of predetermined k (k is a natural number of 2 or more) types of screen size range values, respectively are recorded; maintaining a template storage unit storing a template set for each of a plurality of predetermined UI components, in which the template set for each of the plurality of UI components means a set constituted by a plurality of design templates pre-made for expressing each UI component, and a platform code for the hardware platform and a screen code for the screen size range value pre-specified to match each design template from the n types of hardware platforms and the k types of screen size range values, respectively are allocated to the plurality of design templates included in the template set for each of the plurality of UI components; generating, as a driving instruction for the application is executed in a first electronic device in which the application constituted by the plurality of UI components is installed, when a design configuration request instruction for the plurality of UI components constituting the application is received from the first electronic device, a configuration event for conducting a design configuration for the plurality of UI components; confirming, when the configuration event is generated, information on a first hardware platform and a first screen size which match the first electronic device, and then extracting a first platform code corresponding to the first hardware platform by referring to the first table and extracting a first size code corresponding to a screen size range value to which the first screen size belongs by referring to the second table; and matching a design template to which the first platform code and the first size code are allocated among a plurality of design templates included in the template set corresponding to each UI component with each of the plurality of UI components by referring to the template storage unit, and then transmitting an application instruction for instructing to apply the UI design of each of the plurality of UI components constituting the application as the design template which matches each UI component to the first electronic device while transmitting the design template which matches each of the plurality of UI components.

The present invention presents a UI component configuration system apparatus for providing a service that can dynamically transform and configure, according to characteristics of an electronic device in which applications are driven, designs of UI components included in the applications, and the operating method thereof to provide an appropriate UI design according to device characteristics of a user to the user.

BRIEF DESCRIPTION OF THE DRAWINGS

FIG. 2 is a flowchart illustrating the operating method of a UI component configuration system apparatus that provides a UI component configuration service that can transform and configure UI components of applications based on device characteristics according to an exemplary embodiment of the present invention.

DETAILED DESCRIPTION

Figure 1:
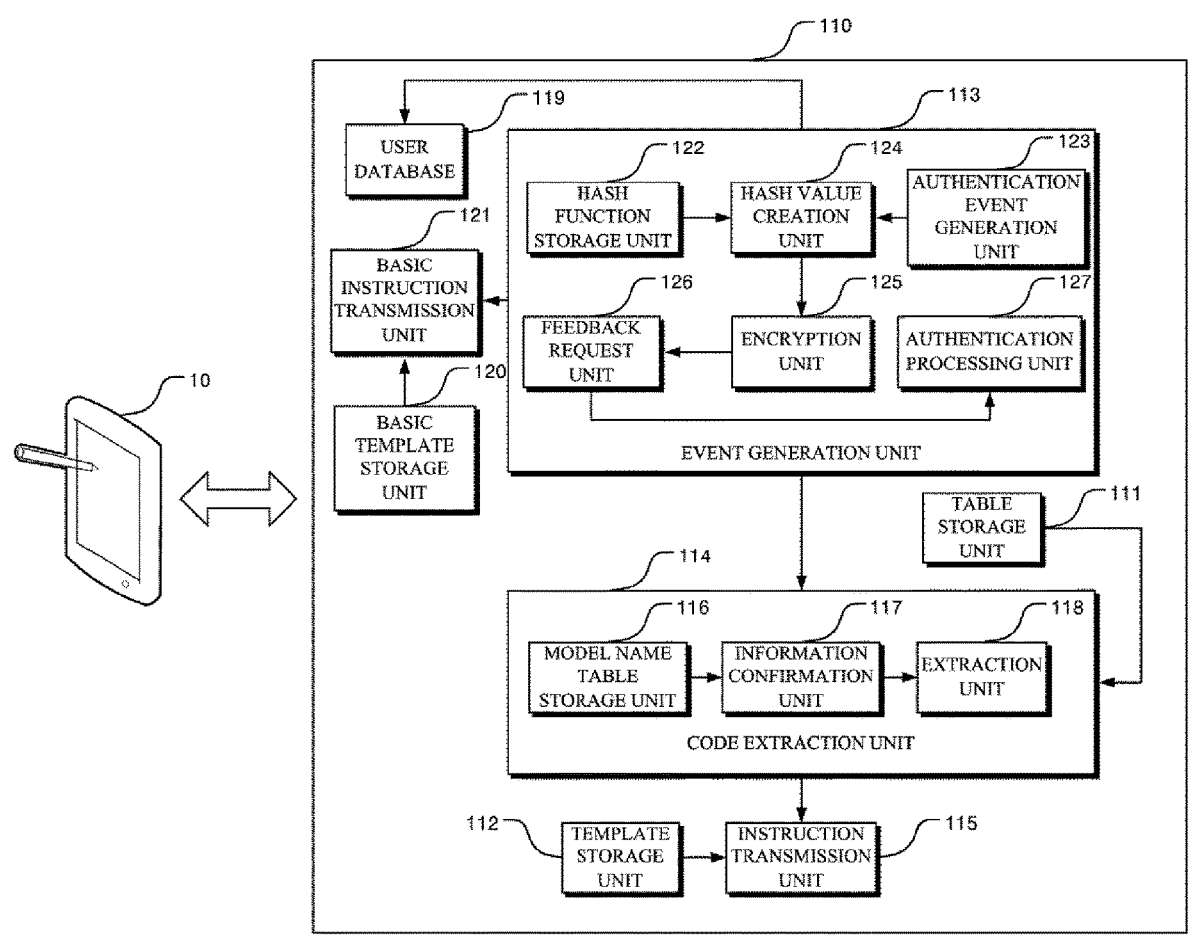
FIG. 1 is a diagram illustrating a structure of a UI component configuration system apparatus that provides a UI component configuration service that can transform and configure UI components of applications based on device characteristics according to an exemplary embodiment of the present invention.

Hereinafter, exemplary embodiments of the present invention will be described in detail with reference to the accompanying drawings. The description does not limit the present invention to specific exemplary embodiments, and it should be understood that the present invention covers all the modifications, equivalents and replacements included within the idea and technical scope of the present invention.

In describing each drawing, like reference numerals refer to like elements and if not contrarily defined, all terms used herein including technological or scientific terms have the same meanings as those generally understood by a person with ordinary skill in the art.

In this document, unless explicitly described to the contrary, the word "comprise" and variations such as "comprises" or "comprising", will be understood to imply the inclusion of stated elements but not the exclusion of any other elements. Further, in various exemplary embodiments of the present invention, each of components, functional blocks or means may be constituted by one or more lower components and electrical, electronic, and mechanical functions performed by respective components may be implemented as various known devices or mechanical elements including an electronic circuit, an integrated circuit, an Application Specific Integrated Circuit (ASIC), etc., and the respective components may be separately implemented or two or more components may be integrated into one and implemented.

Meanwhile, blocks of the accompanying block diagram or steps of a flowchart may be appreciated as meaning computer program instructions mounted on a processor or a memory of data processible equipment such as a universal computer, a special computer, a portable notebook computer, a network computer, etc., and performing designated functions. Since the computer program instructions may be stored in a memory provided in a computer device or a computer readable memory, functions described in blocks of a block diagram or steps of a flowchart may be produced as a manufactured object including an instruction mean performing the functions. Moreover, each block or each step may represent a part of a module, a segment, or a code that includes one or more executable instructions for executing a specified logical function(s). It should also be noted that in some replaceable embodiments, the functions mentioned in the blocks or steps may also be executed differently from a predetermined order. For example, two blocks or steps that are subsequently illustrated are substantially simultaneously carried out, or may be performed in a reverse order, and in some cases, the functions may be performed while some blocks or steps are omitted.

FIG. 1 is a diagram illustrating a structure of a UI component configuration system apparatus that provides a UI component configuration service that can transform and configure UI components of applications based on device characteristics according to an exemplary embodiment of the present invention.

Referring to FIG. 1, the UI component configuration system apparatus 110 according to the present invention includes a table storage unit 111, a template storage unit 112, an event generation unit 113, a code extraction unit 114, and an instruction transmission unit 115.

The table storage unit 111 stores a first table in which platform codes corresponding to predetermined n (n is a natural number of 2 or more) types of hardware platforms, respectively are recorded and a second table in which size codes corresponding to each of predetermined k (k is a natural number of 2 or more) types of screen size range values, respectively are recorded.

For example, the table storage unit 111 may store a first table shown in Table 1 below and a second table shown in Table 2 below.

TABLE 1

| n types of hardware platforms | Platform codes |
| --- | --- |
| Desktop computer | Platform code 1 |
| Mobile terminal | Platform code 2 |
| Tablet PC | Platform code 3 |
| Console video game machine | Platform code 4 |
| ... | ... |

TABLE 2

| k types of screen size range values | Size codes |
| --- | --- |
| 0 to 5 inches | Size code 1 |
| 5 to 10 inches | Size code 2 |
| 10 to 15 inches | Size code 3 |
| 15 to 20 inches | Size code 4 |
| ... | ... |

The template storage unit 112 stores a template set for each of a plurality of predetermined UI components.

Here, the plurality of UI components mean components constituting the UI of the application, such as a button, a text input box, a menu window, etc.

The template set for each of the plurality of UI components means a set constituted by a plurality of design templates pre-made for expressing each UI component.

For example, when there is the UI component called 'button', the template set for 'button' may mean a set constituted by a plurality of design templates pre-made for expressing the UI component called 'button' on the UI. In this regard, the template set for 'button' may be constituted by design templates such as 'round-shaped template', 'square-shaped template', 'rhombus-shaped template, etc.

In this case, a platform code for the hardware platform and a screen code for the screen size range value pre-specified to match respective design templates may be allocated to a plurality of design templates included in template sets for the plurality of respective UI components from the n types of hardware platform and the k types of screen size range values, respectively.

For example, when the design template called 'round-shaped template' is present in the template set for the UI component called 'button', 'platform code 2' corresponding to 'mobile terminal' pre-specified to match 'round-shaped template' among n types of hardware platforms shown in Table 1 above may be allocated and 'size code 2' corresponding to '5 to 10 inches' pre-specified to match 'round-shaped template' among k types of screen size range values shown in Table 2 above may be allocated to the 'round-shaped template'.

In such a situation, when in a first electronic device 10 in which an application constituted by the plurality of UI components is installed, a driving instruction for the application is executed, the first electronic device 10 may generate a design configuration request instruction for requesting configuration of designs of the plurality of UI components constituting the application, and transmit the generated design configuration request instruction to the UI component configuration system apparatus 110 of the present invention.

As a result, when the design configuration request instruction for the plurality of UI components constituting the application is received to the UI component configuration system apparatus 110 from the first electronic device 10, the event generation unit 113 generates a configuration event for conducting configuration of the designs of the plurality of UI components.

When the configuration event is generated, the code extraction unit 114 confirms information on a first hardware platform and a first screen size which match the first electronic device 10, and then extracts a first platform code corresponding to the first hardware platform by referring to the first table and extracts a first size code corresponding to a screen size range value to which the first screen size belongs by referring to the second table.

In this case, according to an exemplary embodiment of the present invention, the code extraction unit 114 may include a model name table storage unit 116, an information confirmation unit 117, and an extraction unit 118.

The model name table storage unit 116 stores a model name table in which a plurality of predetermined product model names and hardware platforms corresponding to the plurality of product model names, respectively are recorded.

For example, the model name table may be configured as shown in Table 3 below.

TABLE 3

| Plurality of product model names | Hardware platforms |
| --- | --- |
| AD1235 | Console video game machine |
| SDFG12 | Mobile terminal |
| ASDG123145 | Mobile terminal |
| ZXC1123145 | Desktop computer |
| ... | ... |

When the configuration event is generated by the event generation unit 113, the information confirmation unit 117 may transmit, to the first electronic device 10, an information request instruction for requesting transmission of a product model name and display information for the first electronic device 10.

Then, the first electronic device 10 confirms device information of the first electronic device 10 in response to the information request instruction to confirm a first product model name which is the product model name of the first electronic device 10 and first display information which is display information of the first electronic device 10. Here, the display information means information representing a screen size, a resolution, a panel type, etc., of a display mounted on or connected to the first electronic device 10.

As such, when the first product model name and the first display information are received to the UI component configuration system apparatus 110 to the first electronic device 10 in response to the information request instruction, the information confirmation unit 117 confirms the hardware platform recorded to correspond to the first product model name as the first hardware platform matching the first electronic device 10, and confirms the first screen size matching the first electronic device 10 from the first display information, by referring to the model name table.

For example, when the first product model name received from the first electronic device 10 is 'ASDG123145', the information confirmation unit 117 may confirm a hardware platform 'mobile terminal' recorded to correspond to 'ASDG123145' as the first hardware platform corresponding to the first electronic device 10, by referring to the model name table shown in Table 3 above.

When the first hardware platform and the first screen size are confirmed, the extraction unit 118 extracts the first platform code corresponding to the first hardware platform by referring to the first table and extracts the first size code corresponding to a screen size range value to which the first screen size belongs by referring to the second table.

For example, when the first hardware platform is confirmed as 'mobile terminal' and the first screen size is confirmed as '7 inches', the extraction unit 118 may extract 'platform code 2' corresponding to 'mobile terminal' by referring to the first table shown in Table 1 above and extract 'size code 2' corresponding to a screen size range value '5 to 10 inches' to which '7 inches' belongs by referring to the second table shown in Table 2 above.

The instruction transmission unit 115 matches a design template to which the first platform code and the first size code are allocated among a plurality of design templates included in the template set corresponding to each UI component by referring to the template storage unit 112 with respect to each of the plurality of UI components, and then transmits, to the first electronic device 10, an application instruction for instructing to apply the UI design of each of the plurality of UI components constituting the application as the design template which matches each UI component while transmitting the design template which matches each of the plurality of UI components.

For example, when the UI component called 'button' is present among the plurality of UI components constituting the application, the template set for 'button' is as 'round-shaped template', 'square-shaped template', and 'rhombus-shaped template, and the first platform code is 'platform code 2', and the first size code is 'size code 2', the instruction transmission unit 115 may match the design template to which 'platform code 2' and 'size code 2' are allocated among 'round-shaped template', 'square-shaped template', and 'rhombus-shaped template' included in the template set corresponding to the UI component called 'button' with the UI component called 'button' by referring to the template storage unit 112. By such a scheme, the instruction transmission unit 115 may match the design template to which 'platform code 2' and 'size code 2' are allocated with each of the plurality of UI components constituting the application.

Then, the instruction transmission unit 115 may transmit, to the first electronic device 10, an application instruction for instructing to apply the UI design of each of the plurality of UI components constituting the application as the design template which matches each UI component while transmitting the design template which matches each of the plurality of UI components. In this regard, when the design template which matches the UI component called 'button' among the plurality of UI components constituting the application is 'round-shaped template', the instruction transmission unit 115 may transmit, to the first electronic device 10, an application instruction for instructing to apply the UI design of the UI component 'button' as 'round-shaped template'.

Then, the first electronic device 10 may apply the UI design of each of the plurality of UI components constituting the application as the design template which matches each UI component, based on the application instruction. In this regard, as in the above-described example, when the design template which matches the UI component called 'button' among the plurality of UI components is 'round-shaped template', the first electronic device 10 may apply the UI design of the UI component called 'button' as 'round-shaped template'.

According to an exemplary embodiment of the present invention, the UI component configuration system apparatus 110 may further include a component for allowing only a pre-specified registered user to use the UI component configuration service according to the present invention.

In this regard, according to an exemplary embodiment of the present invention, the UI component configuration system apparatus 110 may further include a user database 119 storing authentication information of a plurality of users pre-specified as a registered user who may use the UI component configuration service.

In this case, the user database 119 may store an authentication code previously issued for each user and a public key corresponding to a private key previously issued for each user, as the authentication information for the plurality of users (here, the authentication code and the private key for each of the plurality of users is previously stored in the electronic device of each user).

In this regard, the user database 119 may store information shown in Table 4 below.

TABLE 4

| Plurality of users | Authentication codes | Public keys |
| --- | --- | --- |
| User 1 | Authentication code 1 | Public key 1 |
| User 2 | Authentication code 2 | Public key 2 |
| User 3 | Authentication code 3 | Public key 3 |
| User 4 | Authentication code 4 | Public key 4 |
| . . . | . . . | . . . |

In this case, when the event generation unit 113 receives the design configuration request instruction from the first electronic device 10, the event generation unit 113 may confirm whether the user of the first electronic device 10 is the registered user who may use the UI component configuration service by referring to the user database 119, and then generate the configuration event when it is configured that the user of the first electronic device 10 is the registered user who may use the UI component configuration service.

In this case, according to an exemplary embodiment of the present invention, the event generation unit 113 may include a hash function storage unit 122, an authentication event generation unit 123, a hash value creation unit 124, an encryption unit 125, a feedback request unit 126, and an authentication processing unit 127 as specific components for performing authentication for the user of the first electronic device 10.

The hash function storage unit 122 stores p (p is a natural number of 2 or more) different hash functions (the p hash functions are also stored in electronic devices of the plurality of users, and different unique numbers constituted by natural numbers of p or less are allocated to the p hash functions, respectively).

For example, when p is '6', the hash function storage unit 122 may store '6' different hash functions shown in Table 5 below.

TABLE 5

| Hash functions | Unique numbers |
| --- | --- |
| Hash function 1 | 1 |
| Hash function 2 | 2 |
| Hash function 3 | 3 |
| Hash function 4 | 4 |
| Hash function 5 | 5 |
| Hash function 6 | 6 |

The authentication event generation unit 123 generates an authentication event for confirming whether the user of the first electronic device 10 is the registered user who may use the UI component configuration service when receiving the design configuration request instruction from the first electronic device 10.

The hash value creation unit 124 extracts, when the authentication event is generated, a first authentication code for the user for the first electronic device 10 from the user database 119, randomly selects a first hash function which is any one of the p hash functions, and then applies the first authentication code to the first hash function as an input to create a first hash value.

In this regard, when the user of the first electronic device 10 is 'user 2' and a first authentication code previously issued for 'user 2' is 'authentication code 2', the hash value creation unit 124 randomly selects the first hash function which is any one of the hash functions shown in Table 5 above as in 'hash function 3', and then applies 'authentication code 2' to 'hash function 3' as the input to create the first hash value.

The encryption unit 125 confirms a first unique number allocated to the first hash function, extracts a first public key for the user of the first electronic device 10 from the user database 119, and then encrypts the first unique number in the first public key to create a first encryption value.

In this regard, as in the example, when the user is assumed as 'user 2' and the first hash function is assumed as 'hash function 3', the encryption unit 125 confirms '3' which is the first unique number allocated to 'hash function 3', extracts 'public key 2' which is the first public key for 'user 2' from the user database 119, and then encrypts the first unique number '3' with 'public key 2' to create the first encryption value.

The feedback request unit 126 requests transmission of a feedback hash value based on the first encryption value while transmitting the first encryption value to the first electronic device 10.

In this case, when the first electronic device 10 receives the transmission request of the feedback hash value from the UI component configuration system apparatus 110 jointly with the first encryption value, the first electronic device 10 decrypts the first encryption value with a first private key for the user of the first electronic device 10 to restore the first unique number, and then selects the first hash function to which the first unique number is allocated among the p hash functions stored in the first electronic device 10, and applies the first authentication code for the user of the first electronic device 10 to the first hash function as the input to generate a first feedback hash value, and then feed back the first feedback hash value to the UI component configuration system apparatus 110.

In this regard, as in the example, when the user is assumed as 'user 2', and it is assumed that the transmission request of the feedback hash value is received from the first electronic device 10 from the UI component configuration system apparatus 110 jointly with the first encryption value, the first electronic device 10 decrypts the first encryption value based on 'private key 2' (here, 'private key 2' is a private key corresponding to 'public key 2' for 'user 2') which is the first private key for 'user 2' to restore the first unique number '3'.

Then, the first electronic device 10 selects 'hash function 3' to which the first unique number '3' is allocated among six hash functions shown in Table 5 above stored in the first electronic device 10 as the first hash function, and then applies 'authentication code 2' which is the first authentication code for 'user 2' to 'hash function 3' as the input to create the first feedback hash value, and then feed back the generated first feedback hash value to the UI component configuration system apparatus 110.

As such, when the UI component configuration system apparatus 110 receives the first feedback hash value from the first electronic device 10 in response to the transmission request of the feedback hash value, the authentication processing unit 127 compares whether the first hash value and the first feedback hash value coincide with each other, and when it is confirmed that both hash values coincide with each other, confirms that the user of the first electronic device 10 is the registered user who may use the UI component configuration service to generate the configuration event.

According to an exemplary embodiment of the present invention, the UI component configuration system apparatus 110 may further include a basic template storage unit 120 and a basic instruction transmission unit 121.

The basic template storage unit 120 stores a predetermined basic design template for each of the plurality of UI components.

Here, the basic design template is a template for basically configuring the design for the UI component regardless of the hardware platform or the screen size, and one basic design template may be present for each UI component.

When the event generation unit 113 confirms that the user of the first electronic device 10 is not the registered user who may use the UI component configuration service, the basic instruction transmission unit 121 transmits, to the first electronic device 10, a basic application instruction for instructing application of the UI design of each of the plurality of UI components constituting the application as the basic design template for each UI component while transmitting the basic design template for each of the plurality of UI components.

Then, the first electronic device 10 may apply the UI design of each of the plurality of UI components constituting the application as the basic design template for each UI component, in response to the basic application instruction.

FIG. 2 is a flowchart illustrating the operating method of a UI component configuration system apparatus that provides a UI component configuration service that can transform and configure UI components of applications based on device characteristics according to an exemplary embodiment of the present invention.

In step S210, a table storage unit is maintained, which stores a first table in which platform codes corresponding to predetermined n (n is a natural number of 2 or more) types of hardware platforms, respectively are recorded and a second table in which size codes corresponding to each of predetermined k (k is a natural number of 2 or more) types of screen size range values, respectively are recorded.

In step S220, a template storage unit is maintained, which stores a template set for each of a plurality of predetermined UI components, in which the template set for each of the plurality of UI components means a set constituted by a plurality of design templates pre-made for expressing each UI component, and a platform code for the hardware platform and a screen code for the screen size range value pre-specified to match each design template from the n types of hardware platforms and the k types of screen size range values, respectively are allocated to the plurality of design templates included in the template set for each of the plurality of UI components.

In step S230, as a driving instruction for the application is executed in a first electronic device in which the application constituted by the plurality of UI components is installed, when a design configuration request instruction for the plurality of UI components constituting the application is received from the first electronic device, a configuration event for conducting a design configuration for the plurality of UI components is generated.

In step S240, when the configuration event is generated, information on a first hardware platform and a first screen size which match the first electronic device is confirmed, and then a first platform code corresponding to the first hardware platform is extracted by referring to the first table and a first size code corresponding to a screen size range value to which the first screen size belongs is extracted by referring to the second table.

In step S250, a design template to which the first platform code and the first size code are allocated among a plurality of design templates included in the template set corresponding to each UI component is matched with each of the plurality of UI components by referring to the template storage unit, and then an application instruction for instructing to apply the UI design of each of the plurality of UI components constituting the application as the design template which matches each UI component is transmitted to the first electronic device while transmitting the design template which matches each of the plurality of UI components.

In this case, according to an exemplary embodiment of the present invention, step S240 may include a step of maintaining a model name table storage unit storing a model name table in which a plurality of predetermined product model names and hardware platforms corresponding to the plurality of product model names, respectively are recorded, a step of transmitting an information request instruction for requesting transmission of a product model name and display information for the first electronic device to the first electronic device when the configuration event is generated, and then when a first product model name and first display information are received from the first electronic device in response to the information request instruction, confirming the hardware platform recorded to correspond to the first product model name as the first hardware platform which matches the first electronic device by referring to the model name table and confirming the first screen size which matches the first electronic device from the first display information, and a step of extracting, when the first hardware platform and the first screen size are confirmed, the first platform code corresponding to the first hardware platform by referring to the first table and extracting the first size code corresponding to the screen size range value to which the first screen size belongs by referring to the second table.

According to an exemplary embodiment of the present invention, the operating method of the UI component configuration system apparatus may further include maintaining a user database storing authentication information of a plurality of users pre-specified as a registered user who may use the UI component configuration service.

In this case, in step S230, when the design configuration request instruction is received from the first electronic device, it is confirmed whether the user of the first electronic device is the registered user who may use the UI component configuration service by referring to the user database, and then the configuration event may be generated when it is confirmed that the user of the first electronic device is the registered user who may use the UI component configuration service.

In this case, according to an exemplary embodiment of the present invention, the operating method of the UI component configuration system apparatus may further include a step of maintaining a basic template storage unit storing a predetermined basic design template for each of the plurality of UI components and a step of transmitting, to the first electronic device, a basic application instruction for instructing application of the UI design of each of the plurality of UI components constituting the application as the basic design template for each UI component while transmitting the basic design template for each of the plurality of UI components when it is confirmed that the user of the first electronic device is not the registered user who may use the UI component configuration service.

According to an exemplar embodiment of the present invention, the user database may store an authentication code previously issued for each user and a public key corresponding to a private key previously issued for each user, as the authentication information for the plurality of users (here, the authentication code and the private key for each of the plurality of users are also previously stored in the electronic device of each user).

In this case, step S230 may include a step of maintaining a hash function storage unit storing p (p is a natural number of 2 or more) different hash function (the p hash functions are also stored in the electronic devices of the plurality of users, and different unique numbers constituted by natural numbers of p or less are allocated to the p hash functions, respectively), a step of generating an authentication event for confirming whether the user of the first electronic device is the registered user who may use the UI component configuration service when receiving the design configuration request instruction from the first electronic device, a step of extracting, when the authentication event is generated, a first authentication code for the user for the first electronic device from the user database, randomly selecting a first hash function which is any one of the p hash functions, and then applying the first authentication code to the first hash function as an input to create a first hash value, a step of confirming a first unique number allocated to the first hash function, extracting a first public key for the user of the first electronic device from the user database, and then encrypting the first unique number with the first public key to create a first encryption value, a step of requesting transmission of a feedback hash value based on the first encryption value while transmitting the first encryption value to the first electronic device, and a step of comparing, when receiving the first feedback hash value (the first feedback hash value is a hash value generated by decrypting, by the first electronic device, the first encryption value with a first private key for the user of the first electronic device to restore the first unique number, and then selecting the first hash function to which the first unique number is allocated among the p hash functions stored in the first electronic device, and applying the first authentication code for the user of the first electronic device to the first hash function as an input) from the first electronic device in response to the transmission request of the feedback hash value, whether the first hash value and the first feedback hash value coincide with each other, and when it is confirmed that both hash values coincide with each other, confirming that the user of the first electronic device is the registered user who may use the UI component configuration service to generate the configuration event.

Hereinabove, the operating method of the UI component configuration system apparatus according to an exemplary embodiment of the present invention is described with reference to FIG. 2. Here, since the operating method of the UI component configuration system apparatus according to an exemplary embodiment of the present invention may correspond to the operation of the UI component configuration system apparatus 110 described by using FIG. 1, a more detailed description thereof will be omitted.

The operating method of the UI component configuration system apparatus according to an exemplary embodiment of the present invention may be implemented by a computer program stored in a storage medium for executing the computer program through coupling with a computer.

The operating method of the UI component configuration system apparatus according to an exemplary embodiment of the present invention may be implemented in a program command type which may be performed through various computer means and recorded in a computer readable medium. The computer readable medium may include a program command, a data file, a data structure, etc., singly or combinationally. The program command recorded in the medium may be specially designed and configured for the present invention, or may be publicly known to and used by those skilled in the computer software field. An example of the computer readable recording medium includes magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program command. An example of the program command includes a high-level language code executable by a computer by using an interpreter and the like, as well as a machine language code created by a compiler.

As described above, the present invention has been described by specified matters such as detailed components, and the like and limited exemplary embodiments and drawings, but the description is just provided to assist more overall understanding of the present invention and the present invention is not limited to the exemplary embodiment and various modifications and changes can be made by those skilled in the art from such a disclosure.

Accordingly, the spirit of the present invention should not be defined only by the described exemplary embodiments, and it should be appreciated that claims to be described below and all things which are equivalent to the claims or equivalently modified to the claims are included in the scope of the spirit of the present invention.

What is claimed is:

1. A UI component configuration system apparatus that provides a UI component configuration service that can transform and configure UI components of an application based on device characteristics, comprising:
  a table storage unit storing a first table in which platform codes corresponding to predetermined n, wherein n is a natural number of 2 or more, types of hardware platforms, respectively are recorded and a second table in which size codes corresponding to each of predetermined k, wherein k is a natural number of 2 or more, types of screen size range values, respectively are recorded;
  a template storage unit storing a template set for each of a plurality of predetermined UI components, in which the template set for each of the plurality of UI components means a set constituted by a plurality of design templates pre-made for expressing each UI component, and a platform code for the hardware platform and a screen code for the screen size range value pre-specified to match each design template from the n types of hardware platforms and the k types of screen size range values, respectively are allocated to the plurality of design templates included in the template set for each of the plurality of UI components;
  an event generation unit generating, as a driving instruction for the application is executed in a first electronic device in which the application constituted by the plurality of UI components is installed, when a design configuration request instruction for the plurality of UI components constituting the application is received from the first electronic device, a configuration event for conducting a design configuration for the plurality of UI components;
  a code extraction unit confirming, when the configuration event is generated, information on a first hardware platform and a first screen size which match the first electronic device, and then extracting a first platform code corresponding to the first hardware platform by referring to the first table and extracting a first size code corresponding to a screen size range value to which the first screen size belongs by referring to the second table; and
  an instruction transmission unit matching a design template to which the first platform code and the first size code are allocated among a plurality of design templates included in the template set corresponding to each UI component with each of the plurality of UI components by referring to the template storage unit, and then transmitting an application instruction for instructing to apply the UI design of each of the plurality of UI components constituting the application as the design template which matches each UI component to the first electronic device while transmitting the design template which matches each of the plurality of UI components.

2. The UI component configuration system apparatus of claim 1, wherein the code extraction unit includes
  a model name table storage unit storing a model name table in which a plurality of predetermined product model names and hardware platforms corresponding to the plurality of product model names, respectively are recorded,
  an information confirmation unit transmitting, when the configuration event is generated, an information request instruction for requesting transmission of a product model name and display information for the first electronic device, to the first electronic device, and then, when receiving a first product model name and first display information from the first electronic device in response to the information request instruction, confirming a hardware platform recorded to correspond to the first product model name as the first hardware platform which matches the first electronic device by referring to the model name table, and confirming the first screen size which matches the first electronic device from the first display information, and
  an extraction unit extracting, when the first hardware platform and the first screen size are confirmed, the first platform code corresponding to the first hardware platform by referring to the first table and extracting the first size code corresponding to a screen size range value to which the first screen size belongs by referring to the second table.

3. The UI component configuration system apparatus of claim 1, further comprising:
  a user database storing authentication information of a plurality of users pre-specified as a registered user who may use the UI component configuration service,
  wherein when the design configuration request instruction is received from the first electronic device, the event generation unit confirms whether the user of the first electronic device is the registered user who may use the UI component configuration service by referring to the user database, and then generates the configuration event when it is confirmed that the user of the first electronic device is the registered user who may use the UI component configuration service.

4. The UI component configuration system apparatus of claim 3, further comprising:
a basic template storage unit storing a predetermined basic design template for each of the plurality of UI components; and
when it is confirmed that the user of the first electronic device is not the registered user who may use the UI component configuration service, a basic instruction transmission unit transmitting, to the first electronic device, a basic application instruction for instructing application of the UI design of each of the plurality of UI components constituting the application as the basic design template for each UI component while transmitting the basic design template for each of the plurality of UI components.

5. The UI component configuration system apparatus of claim 3, wherein the user database stores an authentication code previously issued for each user and a public key corresponding to a private key previously issued for each user, as the authentication information for the plurality of users, in which the authentication code and the private key for each of the plurality of users are also previously stored in the electronic device of each user, and
wherein the event generation unit includes
a hash function storage unit storing p, wherein p is a natural number of 2 or more, different hash functions, in which the p hash functions are also stored in electronic devices of the plurality of users, and different unique numbers constituted by natural numbers of p or less are allocated to the p hash functions, respectively,
an authentication event generation unit generating an authentication event for confirming whether the user of the first electronic device is the registered user who may use the UI component configuration service when receiving the design configuration request instruction from the first electronic device,
a hash value creation unit extracting, when the authentication event is generated, a first authentication code for the user for the first electronic device from the user database, randomly selecting a first hash function which is any one of the p hash functions, and then applying the first authentication code to the first hash function as an input to create a first hash value,
an encryption unit confirming a first unique number allocated to the first hash function, extracting a first public key for the user of the first electronic device from the user database, and then encrypting the first unique number in the first public key to create a first encryption value,
a feedback request unit requesting transmission of a feedback hash value based on the first encryption value while transmitting the first encryption value to the first electronic device, and
an authentication processing unit comparing, when the first feedback hash value, in which the first feedback hash value is a hash value generated by decrypting, by the first electronic device, the first encryption value with a first private key for the user of the first electronic device to restore the first unique number, and then selecting the first hash function to which the first unique number is allocated among the p hash functions stored in the first electronic device, and applying the first authentication code for the user of the first electronic device to the first hash function as an input, is received from the first electronic device in response to the transmission request of the feedback hash value, whether the first hash value and the first feedback hash value coincide with each other, and when both hash values coincide with each other, confirms that the user of the first electronic device is the registered user who may use the UI component configuration service to generate the configuration event.

6. An operating method of a UI component configuration system apparatus that provides a UI component configuration service that can transform and configure UI components of an application based on device characteristics, comprising:
maintaining a table storage unit storing a first table in which platform codes corresponding to predetermined n, wherein n is a natural number of 2 or more, types of hardware platforms, respectively are recorded and a second table in which size codes corresponding to each of predetermined k, wherein k is a natural number of 2 or more, types of screen size range values, respectively are recorded;
maintaining a template storage unit storing a template set for each of a plurality of predetermined UI components, in which the template set for each of the plurality of UI components means a set constituted by a plurality of design templates pre-made for expressing each UI component, and a platform code for the hardware platform and a screen code for the screen size range value pre-specified to match each design template from the n types of hardware platforms and the k types of screen size range values, respectively are allocated to the plurality of design templates included in the template set for each of the plurality of UI components;
generating, as a driving instruction for the application is executed in a first electronic device in which the application constituted by the plurality of UI components is installed, when a design configuration request instruction for the plurality of UI components constituting the application is received from the first electronic device, a configuration event for conducting a design configuration for the plurality of UI components;
confirming, when the configuration event is generated, information on a first hardware platform and a first screen size which match the first electronic device, and then extracting a first platform code corresponding to the first hardware platform by referring to the first table and extracting a first size code corresponding to a screen size range value to which the first screen size belongs by referring to the second table; and
matching a design template to which the first platform code and the first size code are allocated among a plurality of design templates included in the template set corresponding to each UI component with each of the plurality of UI components by referring to the template storage unit, and then transmitting an application instruction for instructing to apply the UI design of each of the plurality of UI components constituting the application as the design template which matches each UI component to the first electronic device while transmitting the design template which matches each of the plurality of UI components.

7. The operating method of claim 6, wherein the extracting includes maintaining a model name table storage unit storing a model name table in which a plurality of predetermined product model names and hardware platforms corresponding to the plurality of product model names, respectively are recorded, transmitting, when the configuration event is generated, an information request instruction for requesting transmission of a product model name and display information for the first electronic device, to the first electronic device, and then, when receiving a first product model name and first display information from the first electronic device in response to the information request instruction, confirming a hardware platform recorded to correspond to the first product model name as the first hardware platform which matches the first electronic device by referring to the model name table, and confirming the first screen size which matches the first electronic device from the first display information, and extracting, when the first hardware platform and the first screen size are confirmed, the first platform code corresponding to the first hardware platform by referring to the first table and extracting the first size code corresponding to a screen size range value to which the first screen size belongs by referring to the second table.

8. The operating method of claim 6, further comprising:
maintaining a user database storing authentication information of a plurality of users pre-specified as a registered user who may use the UI component configuration service,
wherein in the generating of the configuration event, when the design configuration request instruction is received from the first electronic device, it is confirmed whether the user of the first electronic device is the registered user who may use the UI component configuration service by referring to the user database, and then the configuration event is generated when it is confirmed that the user of the first electronic device is the registered user who may use the UI component configuration service.

9. The operating method of claim 8, further comprising:
maintaining a basic template storage unit storing a predetermined basic design template for each of the plurality of UI components; and
when it is confirmed that the user of the first electronic device is not the registered user who may use the UI component configuration service, transmitting, to the first electronic device, a basic application instruction for instructing application of the UI design of each of the plurality of UI components constituting the application as the basic design template for each UI component while transmitting the basic design template for each of the plurality of UI components.

10. The operating method of claim 8, wherein the user database stores an authentication code previously issued for each user and a public key corresponding to a private key previously issued for each user, as the authentication information for the plurality of users, in which the authentication code and the private key for each of the plurality of users are also previously stored in the electronic device of each user, and
wherein the generating of the configuration event includes
maintaining a hash function storage unit storing p, wherein p is a natural number of 2 or more, different hash functions, in which the p hash functions are also stored in electronic devices of the plurality of users, and different unique numbers constituted by natural numbers of p or less are allocated to the p hash functions, respectively, generating an authentication event for confirming whether the user of the first electronic device is the registered user who may use the UI component configuration service when receiving the design configuration request instruction from the first electronic device, extracting, when the authentication event is generated, a first authentication code for the user for the first electronic device from the user database, randomly selecting a first hash function which is any one of the p hash functions, and then applying the first authentication code to the first hash function as an input to create a first hash value, confirming a first unique number allocated to the first hash function, extracting a first public key for the user of the first electronic device from the user database, and then encrypting the first unique number in the first public key to create a first encryption value, requesting transmission of a feedback hash value based on the first encryption value while transmitting the first encryption value to the first electronic device, and comparing, when the first feedback hash value, in which the first feedback hash value is a hash value generated by decrypting, by the first electronic device, the first encryption value with a first private key for the user of the first electronic device to restore the first unique number, and then selecting the first hash function to which the first unique number is allocated among the p hash functions stored in the first electronic device, and applying the first authentication code for the user of the first electronic device to the first hash function as an input, is received from the first electronic device in response to the transmission request of the feedback hash value, whether the first hash value and the first feedback hash value coincide with each other, and when both hash values coincide with each other, confirms that the user of the first electronic device is the registered user who may use the UI component configuration service to generate the configuration event.

11. A non-transitory computer readable recording medium having a program recorded therein for allowing a computer to execute an operating method of a UI component configuration system apparatus that provides a UI component configuration service that can transform and configure UI components of an application based on device characteristics, comprising:
maintaining a table storage unit storing a first table in which platform codes corresponding to predetermined n, wherein n is a natural number of 2 or more, types of hardware platforms, respectively are recorded and a second table in which size codes corresponding to each of predetermined k, wherein k is a natural number of 2 or more, types of screen size range values, respectively are recorded;
maintaining a template storage unit storing a template set for each of a plurality of predetermined UI components, in which the template set for each of the plurality of UI components means a set constituted by a plurality of design templates pre-made for expressing each UI component, and a platform code for the hardware platform and a screen code for the screen size range value pre-specified to match each design template from the n types of hardware platforms and the k types of screen size range values, respectively are allocated to the plurality of design templates included in the template set for each of the plurality of UI components;

generating, as a driving instruction for the application is executed in a first electronic device in which the application constituted by the plurality of UI components is installed, when a design configuration request instruction for the plurality of UI components constituting the application is received from the first electronic device, a configuration event for conducting a design configuration for the plurality of UI components;

confirming, when the configuration event is generated, information on a first hardware platform and a first screen size which match the first electronic device, and then extracting a first platform code corresponding to the first hardware platform by referring to the first table and extracting a first size code corresponding to a screen size range value to which the first screen size belongs by referring to the second table; and matching a design template to which the first platform code and the first size code are allocated among a plurality of design templates included in the template set corresponding to each UI component with each of the plurality of UI components by referring to the template storage unit, and then transmitting an application instruction for instructing to apply the UI design of each of the plurality of UI components constituting the application as the design template which matches each UI component to the first electronic device while transmitting the design template which matches each of the plurality of UI components.

* * * * *